United States Patent
LaFary et al.

(10) Patent No.: US 9,592,609 B2
(45) Date of Patent: Mar. 14, 2017

(54) AUTONOMOUS MOBILE ROBOT FOR HANDLING JOB ASSIGNMENTS IN A PHYSICAL ENVIRONMENT INHABITED BY STATIONARY AND NON-STATIONARY OBSTACLES

(71) Applicant: Adept Technology, Inc., Pleasanton, CA (US)

(72) Inventors: Matthew LaFary, Peterborough, NH (US); Matthew Vestal, Keene, NH (US); George V. Paul, Merrimack, NH (US)

(73) Assignee: Omron Adept Technologies, Inc., San Ramon, CA (US)

( * ) Notice: Subject to any disclaimer, the term of this patent is extended or adjusted under 35 U.S.C. 154(b) by 0 days.

(21) Appl. No.: 14/370,372

(22) PCT Filed: Jan. 25, 2013

(86) PCT No.: PCT/US2013/023250
§ 371 (c)(1),
(2) Date: Jul. 2, 2014

(87) PCT Pub. No.: WO2013/112907
PCT Pub. Date: Aug. 1, 2013

(65) Prior Publication Data
US 2014/0350725 A1     Nov. 27, 2014

Related U.S. Application Data

(60) Provisional application No. 61/590,806, filed on Jan. 25, 2012, provisional application No. 61/596,685, filed on Feb. 8, 2012.

(51) Int. Cl.
G05B 19/00    (2006.01)
B25J 9/16     (2006.01)
(Continued)

(52) U.S. Cl.
CPC ........ *B25J 9/1676* (2013.01); *G05B 19/4061* (2013.01); *G05D 1/024* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 4,674,048 A | 6/1987 | Okumura | |
| 4,727,492 A | 2/1988 | Reeve et al. | |

(Continued)

FOREIGN PATENT DOCUMENTS

| | | |
|---|---|---|
| EP | 78357 A2 | 1/2011 |
| JP | 07-281753 A | 10/1995 |

(Continued)

OTHER PUBLICATIONS

Evans. "Help Mate, The Trackless Robotic Courier: A Perspective on the Development of a Commercial Autonomous Mobile Robot," Lecture Notes in Control and Information Sciences, 1998. vol. 236, p. 182-210.

(Continued)

*Primary Examiner* — Jonathan L Sample
(74) *Attorney, Agent, or Firm* — Grady L. White; Law Offices of Grady L. White, LLC

(57) ABSTRACT

An intelligent mobile robot having a robot base controller and an onboard navigation system that, in response to receiving a job assignment specifying a job location that is associated with one or more job operations, activates the onboard navigation system to automatically determine a path the mobile robot should use to drive to the job location, automatically determines that using an initially-selected path could cause the mobile robot to run into stationary or non-stationary obstacles, such as people or other mobile (Continued)

robots, in the physical environment, automatically determines a new path to avoid the stationary and non-stationary obstacles, and automatically drives the mobile robot to the job location using the new path, thereby avoiding contact or collisions with those obstacles. After the mobile robot arrives at the job location, it automatically performs said one or more job operations associated with that job location.

60 Claims, 11 Drawing Sheets

(51) Int. Cl.
G06N 3/00 (2006.01)
G05D 1/02 (2006.01)
G05B 19/4061 (2006.01)

(52) U.S. Cl.
CPC .......... *G05D 1/0274* (2013.01); *G06N 3/008* (2013.01); *G05B 2219/39082* (2013.01); *G05B 2219/40202* (2013.01); *Y10S 901/01* (2013.01); *Y10S 901/46* (2013.01); *Y10S 901/50* (2013.01)

(56) References Cited

U.S. PATENT DOCUMENTS

| | | | |
|---|---|---|---|
| 4,763,055 A | 8/1988 | Daggett et al. | |
| 5,279,672 A | 1/1994 | Betker et al. | |
| 5,324,948 A | 6/1994 | Dudar et al. | |
| 5,559,696 A | 9/1996 | Borenstein | |
| 5,610,815 A | 3/1997 | Gudat et al. | |
| 5,764,014 A | 6/1998 | Jakeway et al. | |
| 5,897,595 A | 4/1999 | Hawkins et al. | |
| 5,931,875 A | 8/1999 | Kemner et al. | |
| 6,374,155 B1* | 4/2002 | Wallach | G05D 1/0274 700/245 |
| 6,496,755 B2 | 12/2002 | Wallach et al. | |
| 6,580,246 B2 | 6/2003 | Jacobs | |
| 6,614,427 B1* | 9/2003 | Aubrey | H04N 13/0275 345/419 |
| 6,667,592 B2 | 12/2003 | Jacobs et al. | |
| 6,748,292 B2 | 6/2004 | Mountz | |
| 6,853,877 B1 | 2/2005 | Slater et al. | |
| 6,895,301 B2 | 5/2005 | Mountz | |
| 7,082,350 B2 | 7/2006 | Skoog | |
| 7,099,745 B2* | 8/2006 | Ebert | B25J 9/1694 244/189 |
| 7,117,068 B2 | 10/2006 | Critchlow | |
| 7,135,991 B2 | 11/2006 | Slemmer et al. | |
| 7,272,467 B2 | 9/2007 | Goncalves et al. | |
| 7,456,596 B2 | 11/2008 | Goodall et al. | |
| 7,532,113 B2 | 5/2009 | Horvitz et al. | |
| 7,650,013 B2 | 1/2010 | Dietsch et al. | |
| 7,693,654 B1 | 4/2010 | Dietsch et al. | |
| 7,729,801 B2 | 6/2010 | Abramson | |
| 7,894,939 B2 | 2/2011 | Zini et al. | |
| 7,912,633 B1 | 3/2011 | Dietsch et al. | |
| 8,169,596 B2 | 5/2012 | Weiss et al. | |
| 8,374,721 B2* | 2/2013 | Halloran | A47L 5/30 318/568.1 |
| 8,688,275 B1 | 4/2014 | Lafary et al. | |
| 9,527,211 B2* | 12/2016 | Posselius | B25J 9/1679 |
| 2002/0049530 A1 | 4/2002 | Poropat | |
| 2003/0030398 A1 | 2/2003 | Jacobs | |
| 2003/0212472 A1* | 11/2003 | McKee | G05D 1/0274 700/245 |
| 2004/0073337 A1* | 4/2004 | McKee | G05D 1/0251 700/245 |
| 2005/0047895 A1 | 3/2005 | Lert, Jr. | |
| 2006/0015215 A1* | 1/2006 | Howard | G05D 1/0094 700/245 |
| 2006/0095160 A1* | 5/2006 | Orita | G05D 1/027 700/248 |
| 2006/0111811 A1* | 5/2006 | Okamoto | B25J 5/007 700/214 |
| 2006/0195226 A1 | 8/2006 | Matsukawa et al. | |
| 2006/0213167 A1* | 9/2006 | Koselka | A01D 46/30 56/10.2 A |
| 2006/0265103 A1 | 11/2006 | Orita | |
| 2007/0061041 A1* | 3/2007 | Zweig | G05D 1/0261 700/245 |
| 2007/0112461 A1 | 5/2007 | Zini et al. | |
| 2007/0140821 A1 | 6/2007 | Garon et al. | |
| 2007/0156286 A1* | 7/2007 | Yamauchi | G05D 1/0038 700/245 |
| 2007/0192910 A1* | 8/2007 | Vu | B25J 5/007 700/245 |
| 2007/0294029 A1 | 12/2007 | D'Andrea et al. | |
| 2008/0009969 A1 | 1/2008 | Bruemmer et al. | |
| 2008/0086236 A1* | 4/2008 | Saito | G01S 5/0252 700/245 |
| 2009/0234499 A1* | 9/2009 | Nielsen | B25J 9/161 700/250 |
| 2009/0281661 A1 | 11/2009 | Dooley et al. | |
| 2010/0049364 A1 | 2/2010 | Landry et al. | |
| 2010/0094459 A1 | 4/2010 | Cho et al. | |
| 2011/0054689 A1* | 3/2011 | Nielsen | G05D 1/0088 700/258 |
| 2011/0137457 A1 | 6/2011 | Zini | |
| 2011/0202175 A1* | 8/2011 | Romanov | A47L 11/4011 700/250 |
| 2011/0202224 A1* | 8/2011 | Thompson | G05D 1/0227 701/26 |
| 2012/0152877 A1* | 6/2012 | Tadayon | B25J 5/02 212/224 |
| 2014/0336818 A1* | 11/2014 | Posselius | G05D 1/0295 700/248 |
| 2014/0350725 A1* | 11/2014 | LaFary | G06N 3/008 700/253 |
| 2014/0365258 A1* | 12/2014 | Vestal | G06Q 10/06311 705/7.15 |

FOREIGN PATENT DOCUMENTS

| | | | |
|---|---|---|---|
| JP | 2007122304 A | 5/2007 | |
| WO | 2009040777 A2 | 4/2009 | |

OTHER PUBLICATIONS

Thrun et al. "Robust Monte Carlo Localization for Mobile Robots," Artificial Intelligence, Apr. 20, 2000. vol. 128, No. 1-2, p. 99-141.
Wolf et al. "Robust Vision Based Localization by Combining and Image Retrieval System with Monte Carlo Localization," IEEE Transactions on Robotics, Apr. 2005. vol. 21, No. 2, p. 208-216.
Weiss et al. "Keeping Track of Position and Orientation of Moving Indoor Systems by Correlation of Range-Finder Scans," Proceedings of the IEEE/RSJ/GI International Conference on Intelligent Robots and Systems, 1994. vol. 1, p. 595-601.
Thrun et al. "Learning Maps for Indoor Mobile Robot Navigation," School of Computer Science, Apr. 14, 1996.
Thrun et al. "A Probabilistic Approach to Concurrent Mapping and Localization for Mobile Robots," Machine Learning and Autonomous Robots, 31/5 ed., Kluwer Academic Publishers, Boston, Mar. 14, 1998.
Thrun et al. "A Probabilistic Online Mapping Algorithm for Teams of Mobile Robots," International Journal of Robotics, 2001. vol. 20(5), p. 335-363.
Thrun et al. "Map Learning and High-Speed Navigation in RHINO," Carnegie Mellon University, 1997.
Thrun et al. "An Approach to Learning Mobile Robot Navigation," Robotics and Autonomous Systems, Mar. 1995.
Fox et al. "Active Markov Localization for Mobile Robots," Mar. 19, 1998.
Liu et al. "Using EM to Learn 3D Models with Mobile Robots," Eighteenth International Conference on machine Learning, Jun. 28, 2001.

(56) References Cited

OTHER PUBLICATIONS

Gutmann et al. "Incremental Mapping of large Cyclic Environments," Proceedings of the IEEE International Symposium on Computational Intelligence in Robotic and Automation, 2000.
Nuchter A. et al: "Towards Semantic Maps for Mobile Robots", Robotics and Autonomous Systems, Elsevier Science Publishers, Amsterdam, NL, vol. 56, No. 11, Nov. 30, 2008, pp. 915-926.
V. Sequeira et al: "Automated Reconstruction of 3D Models from Real Environments", ISPRS Journal of Photogrammetry and Remote Sensing, vol. 54, No. 1, Feb. 1, 1999, pp. 1-22.

* cited by examiner

```
2D-Map
MapInfo: DockType "Name=Dock" "Label=Dock" "NameRequired=1" "Color0=0xffff00" "Heading=Required"
MapInfo: GoalType "Name=Goal" "Label=Goal" "NameRequired=1" "Color0=0x808080" "Color1=0x00ffff" "Color2=0x808080"
MapInfo: SectorType "Name=ResistedSector" "Label=ResistedSector" "Desc=Area that the robot will try to avoid, but will
drive through if necessary." "NameRequired=1" "Color0=0x2ea72" "Color1=0xbe40ce" "NameRequired=1"
MapInfo: SectorType "Name=TwoWayDriveOnRightSector" "Label=PreferredDirectionRight" "Desc=Two Way Drive on Right"
"NameRequired=1" "Color0=0xadd3b4" "Color1=0x91b899" "Shape=GradTwoWayDriveOnRight" "NameRequired=1"
Cairn: ResistedSector 0 0 0.000000 "" ICON "ResistedSector17" -22940 -14446 -14715 -12764
Cairn: ResistedSector 0 0 0.000000 "" ICON "ResistedSector14" -22794 -12582 -7732 -10205
Cairn: GoalWithHeading -20215 -8485 -87.900000 "" ICON "Mechanical"
Cairn: ResistedSector 0 0 0.000000 "" ICON "ResistedSector18" -18240 -10369 -14050 -9911
Cairn: Goal -13843 -3856 0.000000 "" ICON "Software"
Cairn: ResistedSector 0 0 0.000000 "" ICON "ResistedSector15" -12453 -13401 -9276 -9816
Cairn: ResistedSector 0 0 90.000000 "" ICON "ResistedSector13" -7824 15631 -6354 16802
Cairn: Goal -7126 -16086 0.000000 "" ICON "Empty Conference"
Cairn: Goal -5823 -7570 0.000000 "" ICON "RD Lab West Mid"
Cairn: GoalWithHeading -5693 -1653 135.145272 "" ICON "RD_Lab_West_North"
Cairn: GoalWithHeading -3908 -28384 -179.800000 "" ICON "Offices"
Cairn: ResistedSector 0 0 0.000000 "" ICON "ResistedSector12" -1804 -10937 1082 -7773
Cairn: TwoWayDriveOnRightSector 0 0 0.000000 "" ID=13346 "PreferredDirectionRight" 2271 -18108 14449 -13021
Cairn: ResistedSector 0 0 0.000000 "" ICON "ResistedSector16" 3896 -27097 6854 -25557
Cairn: GoalWithHeading 4195 -28833 -80.258274 "" ICON "Hall Entry"
Cairn: GoalWithHeading 5868 -10253 -90.000000 "" ICON "RD Mid"
Cairn: GoalWithHeading 17212 -1515 -90.000000 "" ID=3145776 "RD Northeast"
Cairn: GoalWithHeading 19220 -25601 -154.771535 "" ICON "Closet"
Cairn: Goal 21597 -7451 0.000000 "" ICON "RD_comm_support"
LINES
-24162 -6218 -21563 -6227
-24148 -2057 -24162 -6218
-24141 168 -24148 -2057
-24096 -10015 -24097 -13709
-24096 -1842 -24096 -1843
-24096 21597 -7451 -24096 -1843
```

FIG. 10

AUTONOMOUS MOBILE ROBOT FOR HANDLING JOB ASSIGNMENTS IN A PHYSICAL ENVIRONMENT INHABITED BY STATIONARY AND NON-STATIONARY OBSTACLES

FIELD OF THE INVENTION

The present invention generally relates to mobile robots. In particular, the present invention is directed to mobile robots for handling job assignments in a physical environment inhabited by stationary and non-stationary obstacles.

RELATED ART

In a typical order processing environment, human operators are frequently required to fill orders by placing products on wire-frame carts and moving them throughout a factory or warehouse. There are many disadvantages to using human operators, including for example: difficulties tracking the physical location of the transported items; difficulties moving items around the factory or warehouse according to schedules dictated by automated components in the order processing system; exposing the human operators to increased risks of physical injury or death; and exposing the manufacturing equipment and products to higher contamination levels caused by the presence of humans. In a typical industrial manufacturing environment, products may be moved about the factory or warehouse using an overhead product transportation system (monorails) suspended from the ceiling instead of humans. The disadvantages of using overhead transport systems include: being constrained to a fixed (linear) delivery path; not being able to deliver products to down-stream destinations if an upstream component in the process is out of service; and having to move the entire overhead infrastructure to a new location if a single workstation in the process has to be moved to a different location.

To help move materials between locations in the factory or warehouse more efficiently, mobile robots, also called automated guided vehicles (or "AGVs"), have been introduced to order processing plants, manufacturing facilities, hospitals and office buildings. But the utility and flexibility of conventional mobile robots used in these environments has heretofore been very limited due to several significant operational shortcomings, including: (1) the mobile robots having to navigate by following markers, rails, wires or grids installed in the floors of the facilities; (2) the mobile robots having little or no ability to determine their routes to specified destinations (i.e., to navigate autonomously); (3) the mobile robots having little or no ability to modify a selected route to a specified destination in response to other non-stationary objects, including people, encountered while driving to the specified destination; and (4) the mobile robots having little or no ability to automatically determine and carry out a particular task or operation upon arriving at a specified destination; to name but a few examples. Another significant shortcoming of existing mobile robot technology is that the existing solutions tend to rely on the mobile robots always being able to travel in straight lines, which is not conducive to servicing tools and workstations having varying shapes and sizes, or that are physically offset from one another. Many factories grow over time as funds permit, and so are not able to be laid out in perfectly straight lines.

SUMMARY OF THE INVENTION

Embodiments of the present invention address and solve these problems and shortcomings by providing an intelligent mobile robot that, in response to receiving a job assignment: (1) automatically determines how to get to the job location in the physical environment (i.e., autonomous navigation) to carry out the job assignment; (2) automatically determines that traveling along an initially-selected path is likely to cause the mobile robot to come into contact with or collide with another non-stationary object; (3) automatically determines a new path to use to reach the intended destination, thereby avoiding potential collisions with stationary and non-stationary obstacles, including people, in the physical environment; and (4) automatically performs a job operation once it has reached the intended job location. Notably, all of these determinations are made on board the mobile robot itself, which provides a tremendous benefit in terms of the utility and flexibility of the mobile robot, especially in situations involving large numbers of mobile robots, large numbers of non-stationary obstacles, including people, in the physical environment, and large and diverse collections of job locations and job operations. This technology is especially useful in environments such as, but not limited to, ISO 5 clean room environments, narrow aisle-ways (e.g., less than 2 meters wide), under typical semiconductor fabrication facility conditions.

In one aspect of the present invention, there is provided a mobile robot for handling a job assignment in a physical environment inhabited by stationary and non-stationary obstacles. The mobile robot generally comprises a robot base that includes a map defining a floor plan for the physical environment, a robot base controller and an onboard navigation system. The job assignment may include a job location defined by the map, a job operation defined by the map, or both a job location and a job operation. The specified job location may have one or more job operations associated with it, which are to be performed automatically by the mobile robot after the mobile robot arrives at the specified job location. In response to receiving the job assignment, the robot base controller generates a command signal that causes the onboard navigation system to automatically determine, in accordance with the map, how (as in "what path to use") to get to the place on the floor plan that represents the specified job location. The onboard navigation system then automatically follows the path to the job location required by the job assignment. If the mobile robot encounters a stationary obstacle (such as a closed door or piece of furniture) or a non-stationary obstacle (such as a person, vehicle or other mobile robot), the onboard navigation system automatically calculates a new path to follow to get to the required job location.

The map defines a floor plan corresponding to the physical environment, and also defines a set of job locations in respect to the floor plan. For at least some of the job locations on the floor plan, the map also defines a set of one or more job operations to be performed automatically at that job location. Thus, the map may contain, for example, data defining where a particular job location exists in terms of coordinates delineating the floor plan, as well as certain job operations that should be carried out automatically upon arrival at that particular job location. In response to receiving a job assignment on the robot base controller, the onboard navigation system is activated to use the map, the floor plan and the coordinates in the floor plan to drive the mobile robot to a set of coordinates on the floor plan (i.e., the "floor plan job location") as defined by the map. The floor plan location in the map represents an actual job location in the real-world of the physical environment. So, for example, if the map defines a job location called "pod loading station," which represents an actual pod loading station in the real world of the physical environment, and the map also identifies, in terms of floor plan coordinates, where on the floor plan the "pod loading station" is located, then the onboard navigation system is configured to use the map, the floor plan and the coordinates to drive the mobile robot to the pod loading station on the map, thereby also causing the mobile robot to drive to the actual pod loading location in the real-world of the physical environment.

In another example, the job assignment sent to the mobile robot may command the mobile robot to perform a certain job operation, such as "Charge Battery," without identifying, in the assignment command itself, any particular location where this job operation should be performed. The map definitions may include sufficient information to permit the onboard navigation system in the mobile robot to derive the actual location for the job assignment based solely on what job operation is to be performed. So, in this example, having received an assignment to "Charge Battery," the onboard navigation system on the mobile robot will use the map to obtain the current locations of battery charging stations in respect to the floor plan, as well as the current availability of the nearby battery charging stations, and based on this information, automatically drive the mobile robot to the nearest battery charging station that is not currently being used by another mobile robot. Once there, the mobile robot could automatically start charging its battery because charging its battery is the task that the assignment commanded the mobile robot to do. Similarly, if the job assignment command specifies a location, such as "Go To Battery Charging Station No. 5," without specifying a job operation to perform upon arrival at the specified location, the mobile robot may be configured to automatically start charging its battery on arrival because the definitions and attributes stored in the map indicate that battery charging is one of the job operations associated with battery charging station No. 5.

The map may also dictate through its definitions that certain job operations shall occur at certain locations. In this case, when a mobile robot receives a job assignment telling it to go to a particular location, the job assignment does not necessarily need to specify which job operations the mobile robot should carry out upon arrival because the map in the mobile robot's memory has already associated one or more job operations with that particular job location. Thus, using the map's defined floor plan, as well as the job location and job operation definitions in the map, mobile robots operating according to embodiments of the present invention are capable of receiving and processing: (a) job assignments that specify job locations without specifying job operations, (b) job assignments that specify job operations without specifying job locations, and (c) job assignments that specify both job locations and job operations.

The robot base controller may be configured to receive the job assignment (or changes associated with the job assignment) from a variety of sources, including without limitation, from a remote job management system via a wireless communications interface, from an operating terminal in the computer network via the wireless communications interface, or from a human via a human-machine interface device attached directly to the mobile robot. The human-machine interface may comprise one or more display devices, monitors, keyboards, keypads, touch screens, scanners, telephones, printers, buttons, speakers, switches, cameras or lights.

The onboard navigation system is configured to carry out several steps automatically, including: (1) determining the job location for the job assignment based on the job assignment and the map; (2) determining that driving the mobile robot along a first path from the mobile robot's current position in the physical environment to an actual job location will cause the mobile robot to come into contact with one of the stationary or non-stationary obstacles in the physical environment; (3) generating a second path, in accordance with the map, to avoid the contact with the stationary or non-stationary obstacles; and (4) driving the mobile robot to the actual job location along the second path. In some embodiments, the onboard navigation system may also determine that driving the mobile robot to the actual job location along the second path could still cause the mobile robot to come into contact with one of the stationary and non-stationary obstacles, and responds by generating and using a third path, in accordance with the map, to avoid the contact. Thus, the onboard navigation system is capable of recalculating and changing the path of travel to drive the mobile robot to the specified or implied job location (representing the actual job location in the physical environment) as many times as necessary, depending on the number of stationary or non-stationary obstacles encountered along the way.

The first path may be determined by the onboard navigation system itself in accordance with the map, or it may be determined by another computer system, such as a remote job management system, and received on the mobile robot via a wireless communications interface on the mobile robot. Typically, the onboard navigation system uses sensor readings for the physical environment to determine that driving the mobile robot to the job location along the first path or along the second path could cause the mobile robot to come into contact with one or more stationary or non-stationary obstacles. But the robot base controller and/or the onboard navigation system may also be configured to periodically receive, via the wireless communication interface, updated information indicating the current positions and headings of other mobile robots in the physical environment, as well as other non-stationary obstacles, which the onboard navigation system then uses to determine whether any collisions might occur. Thus, in some embodiments, the map provides the current positions and/or currently-selected paths for one or more non-stationary obstacles in the physical environment—such as another mobile robot, a human being, a motorized vehicle or a non-motorized vehicle—and the onboard navigation system uses those current positions and/or currently-selected paths to assess whether driving the mobile robot to the job location along the first path or along the second path might cause the mobile robot to come into contact with those non-stationary obstacles. In this embodiment, the robot base periodically receives updated information for the map, wherein the updated information accounts for changes in the current positions and currently-selected paths for the non-stationary obstacles.

When the mobile robot reaches the job location specified in the job assignment, the mobile robot automatically carries out one or more job operations associated with the job location by the map. Thus, the robot base controller is configured to automatically generate a command signal that causes the mobile robot to perform one or more job operations associated with the job location by the map. The robot base controller may generate the command signal before or after the mobile robot is driven to the actual job location by the onboard navigation system. Some of the associated job operations may be carried out by the robot payload (e.g., unload cargo), while other associated job operations may be carried out by the robot base (e.g., rotate −90 degrees). Notably, the map does not necessarily associate job operations with all of the job locations on the floor plan. Thus, some job locations will have no associated job operations, while other job locations will have one or more job operations associated with them. In cases where the job location has no job operation associated with it, the mobile robot may obtain instructions about what job operations to perform from the original assignment, or from subsequent assignments received after reaching the job location. The mobile robot may also be configured to receive specific job operation instructions from a human operator located at the job location.

Stationary obstacles in the physical environment that are avoided by mobile robots operating according to embodiments of the present invention may include, for example, a wall, a door, a door frame, a piece of furniture, a workstation, a manufacturing tool, a break in the travelling surface for the mobile robot, an object suspended above said travelling surface, a restricted zone in the physical environment, a contaminated zone in the physical environment, or a dangerous zone in the physical environment. A restricted zone stationary obstacle may be thought of as a "virtual" stationary obstacle, such as a "do not enter" or "one-way" zone, which may be placed into the map by a system operator to control the mobile robot's access to that zone.

Typically, the mobile robot is configured to automatically handle various types of job assignments once it reaches the selected job location in the job assignment. Accordingly, the mobile robot may also have a robot payload, connected to the robot base, which is specifically configured to carry out certain job operations associated with handling the job assignment. If the job assignment includes a selected job operation defined by the map, the robot base controller activates the robot payload to automatically perform that job operation after the mobile robot arrives at the selected job location. The robot payload may include a cargo hold for carrying objects and/or an actuator for performing certain types of jobs. Any number of actuators may be used for the payload, including without limitation, an articulated robotic arm, an electromechanical manipulator, a portable robot, an electric motor, a panning unit, a tilting unit, a conveyor, a mechanical lifting device, a mechanical gripping device, a pump, a sprayer, a vacuum device, a laser, a sampler and a linear actuator.

For embodiments of the present invention having payloads and cargo holds and payload actuators, the payload may also include a robot payload controller, operable with the robot base and/or the robot base controller, which controls the operation of the actuators and/or cargo holds, so that the actuator carries out the real world job operation under the control of the robot payload controller. If the actuator on the robot payload comprises, for instance, an articulated mechanical arm (or an industrial-style robotic manipulator), then the robot base controller generates a command signal that causes the a payload controller on the robot payload to cause the mechanical arm to pick up an object and place that object in the cargo hold on the robot payload. Another signal transmitted from the robot base controller to the payload controller may cause the mechanical arm to remove an object from the cargo hold.

Preferably, the payload controller is configured to send an assignment status signal to the robot base controller indicating whether job assignments have been successfully completed and/or provide error codes and other feedback for the robot base controller when the robot payload cannot complete the job assignment. In certain embodiments, the robot base controller further comprises a status manager configured to record a current status for the mobile robot, which may be transmitted to a remote job management system, to a personal computer communicatively coupled to the mobile robot, and/or to another mobile robot in the network via a wireless communications interface attached to the robot base.

The robot payload on the mobile robot may also include a sensor for performing certain real world job operations. Sensors may include, for example, a video recorder, a sound recorder, a photographic image recorder, an RFID reader, a magnetic stripe reader, a barcode reader, a gas detector, a particle detector, a temperature sensor, a scanner, a distance sensor, a near-field communication sensor and a wireless signal detector. When the robot payload on the mobile robot comprises a cargo hold, the robot payload may also include a sensor configured to detect when an item is located or securely positioned within the cargo hold.

In another aspect of the present invention, there is provided a method of handling a job assignment with a mobile robot in a physical environment inhabited by stationary and non-stationary obstacles, the method comprising the steps of: (1) storing on a robot base a map defining a floor plan corresponding to the physical environment, a set of job locations in respect to the floor plan and a set of job operations associated with one or more of the job locations in the set of job locations; (2) receiving the job assignment on the robot base, the job assignment including a job location defined by the map, a job operation defined by the map, or both; and (3) in response to receiving the job assignment, activating an onboard navigation system on the mobile robot to (a) automatically determine, in accordance with the map, a floor plan location for the job assignment, the floor plan location representing an actual location in the physical environment, (b) automatically determine that driving the mobile robot to the floor plan location along a first path will cause the mobile robot to come into contact with one or more of the stationary or non-stationary obstacles, (c) automatically generate a second path, in accordance with the map, to avoid the contact; and (d) automatically drive the mobile robot to the actual job location represented by the floor plan location using the second path. The final step of the method comprises causing the mobile robot to carry out a job operation, or a set of job operations, associated with the specified job location by the map. In this aspect, the method may further include the steps of: (4) determining on the onboard navigation system that driving the mobile robot along the second path could cause the mobile robot to come into contact with one of the stationary and non-stationary obstacles, (5) generating a third path, in accordance with the map, to avoid the contact, and (6) driving the mobile robot to the actual job location represented by the floor plan location using the third path.

Embodiments of the present invention have a wide range of practical uses, including but not limited to:

Transporting materials and containers, such as uniformly-sized totes, around a manufacturing facility or distribution center. These environments may involve a lot of other vehicular and pedestrian traffic;

Transporting goods, such as pharmaceuticals and lab samples, between different locations within hospital environments. These environments may also involve a lot of vehicular or pedestrian traffic, as well as a lot of interaction with the public (people who are unfamiliar with autonomous vehicles);

Transporting extremely sensitive materials, such as Standard Manufacturing Interface (SMIF) Pods within a cleanroom or between racks or tools used to manufacture SMIF pods;

Transporting electronic equipment, such as LCD screens, telepresence systems, projectors, barcode scanners, or other heavy and/or valuable equipment between locations in a typical office-building; and Environmental monitoring (radio frequency signals, air quality, temperature) at a particular location in any one of the above-listed environments; and RFID scanning for the purposes of asset tracking. For instance, as the mobile robot drives around the physical environment, it scans for RFID tags and catalogs the discovered RFID tags in a database so that assets can be more easily located when they're needed.

BRIEF DESCRIPTION OF THE FIGURES

The accompanying drawings, which are incorporated in and constitute part of the specification, illustrate preferred embodiments of the invention, and, together with the description, serve to explain the principles of the present invention. In the drawings, like reference numbers indicate identical or functionally similar elements. Additionally, the left-most digit(s) of a reference number identifies the drawing in which the reference number first appears.

FIG. 10 illustrates, by way of example, some of the data content of a map file defining a floor plan for the physical environment. The map file is stored in the memory of the mobile robot according to embodiments of the invention.

DETAILED DESCRIPTION OF THE PREFERRED EMBODIMENTS

Reference will now be made in detail to the preferred embodiments of the invention, examples of which are illustrated in the accompanying drawings. Notably, the present invention may be implemented using software, hardware or any combination thereof, as would be apparent to those of skill in the art, and the figures and examples below are not meant to limit the scope of the present invention or its embodiments or equivalents.

Figure 1:
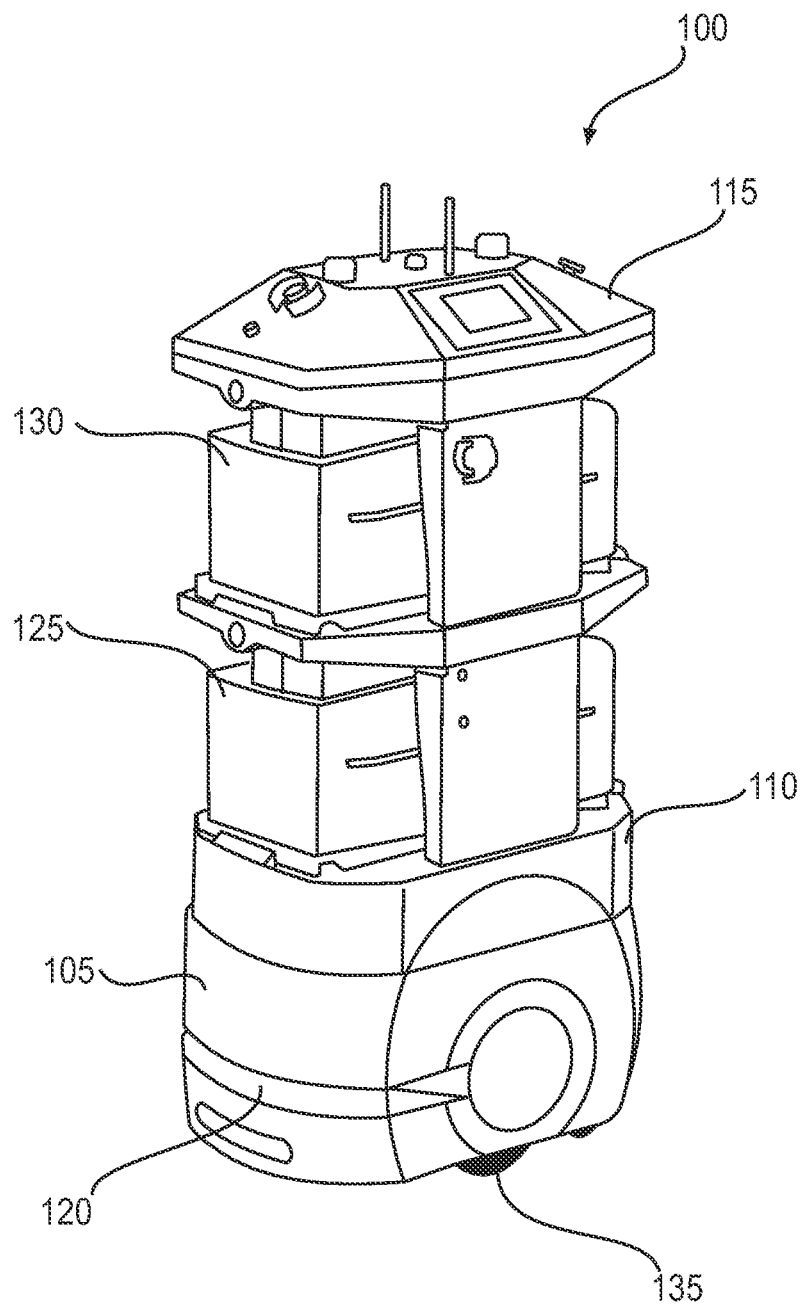
FIG. 1 shows an exemplary embodiment of a mobile robot configured to operate in accordance with the present invention.

An exemplary embodiment of a mobile robot configured to operate in accordance with the present invention is shown in FIG. 1. As shown in FIG. 1, the mobile robot 100 includes a robot base 105 and a robot payload 110, which is connected to and supported by the robot base 105 as the mobile robot 100 moves about the physical environment. A horizontally-oriented laser sensor 120 on the robot base 105 produces a horizontally-oriented plane of laser light rays (not shown) which, when reflected back to the laser sensor 120, helps the onboard navigation system (not shown in FIG. 1) in the robot base 105 detect objects and obstacles (people, furniture, other robots, etc.) in the vicinity and potentially in the travel path of the mobile robot 100. In some embodiments, assistance is needed to load and unload items from shelves on the mobile robot 100. Accordingly, in the embodiment depicted in FIG. 1, the robot payload 110 comprises several cargo holds configured to hold cargo 125 and cargo 130, which may be placed in and removed from the cargo holds by a human operator or by another mobile or industrial robot (not shown in FIG. 1). Wheels 135 on the robot base 105 are electronically coupled to the onboard navigation system via a locomotion microcontroller inside the robot base 105 so as to permit the onboard navigation system to drive the mobile robot 100 to actual locations in the physical environment according to a map stored in the memory of the robot base 105. As shown in FIG. 1, mobile robot 100 is optionally equipped with a vertically-oriented laser sensor 115, which is attached to the robot payload 110 and electronically coupled to the onboard navigation system in the robot base 105. As the mobile robot moves about the physical environment, laser sensor 115 scans and senses in the area in front of the mobile robot 100 in a substantially vertically-oriented plane so as to make it easier for the onboard navigation system in the robot base 105 to detect objects and obstacles that ordinarily would not be detected by the horizontally-oriented laser sensor 120.

Figure 2A:
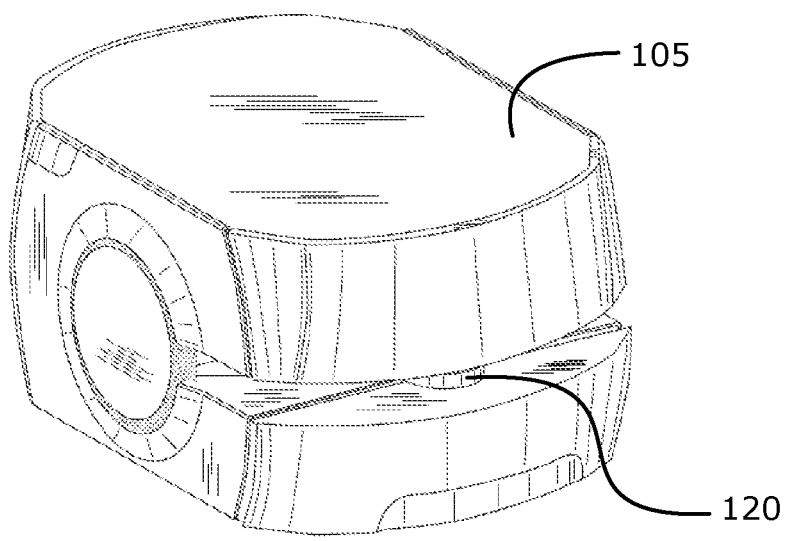
FIGS. 2A and 2B show, respectively, a front perspective view and a side perspective view of the robot base without the robot payload attached.
Figure 2B:
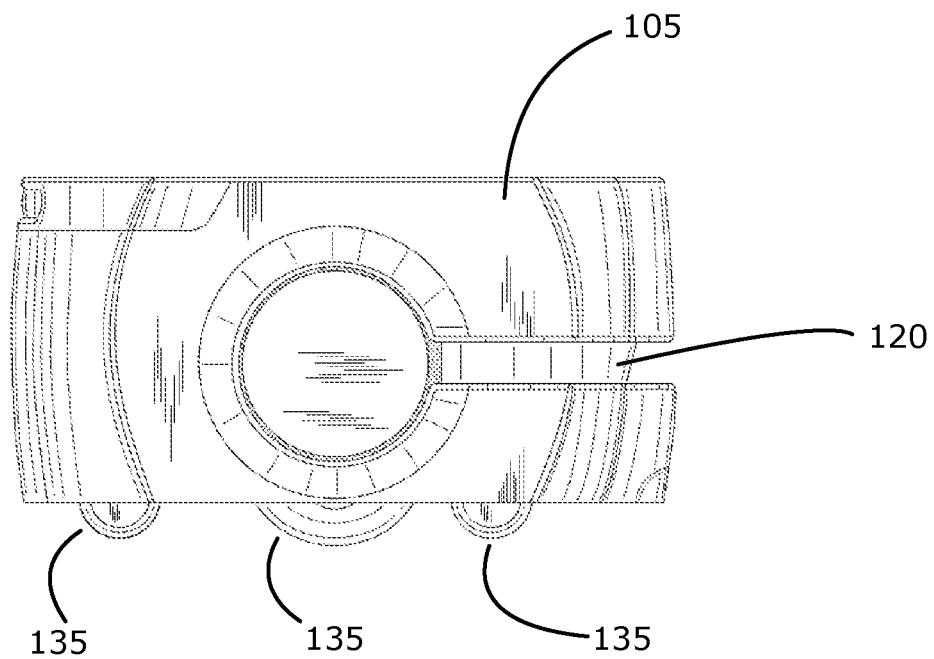

FIGS. 2A and 2B show, respectively, a front perspective view and a side perspective view of the robot base 105 without the robot payload 110 attached.

Figure 3:
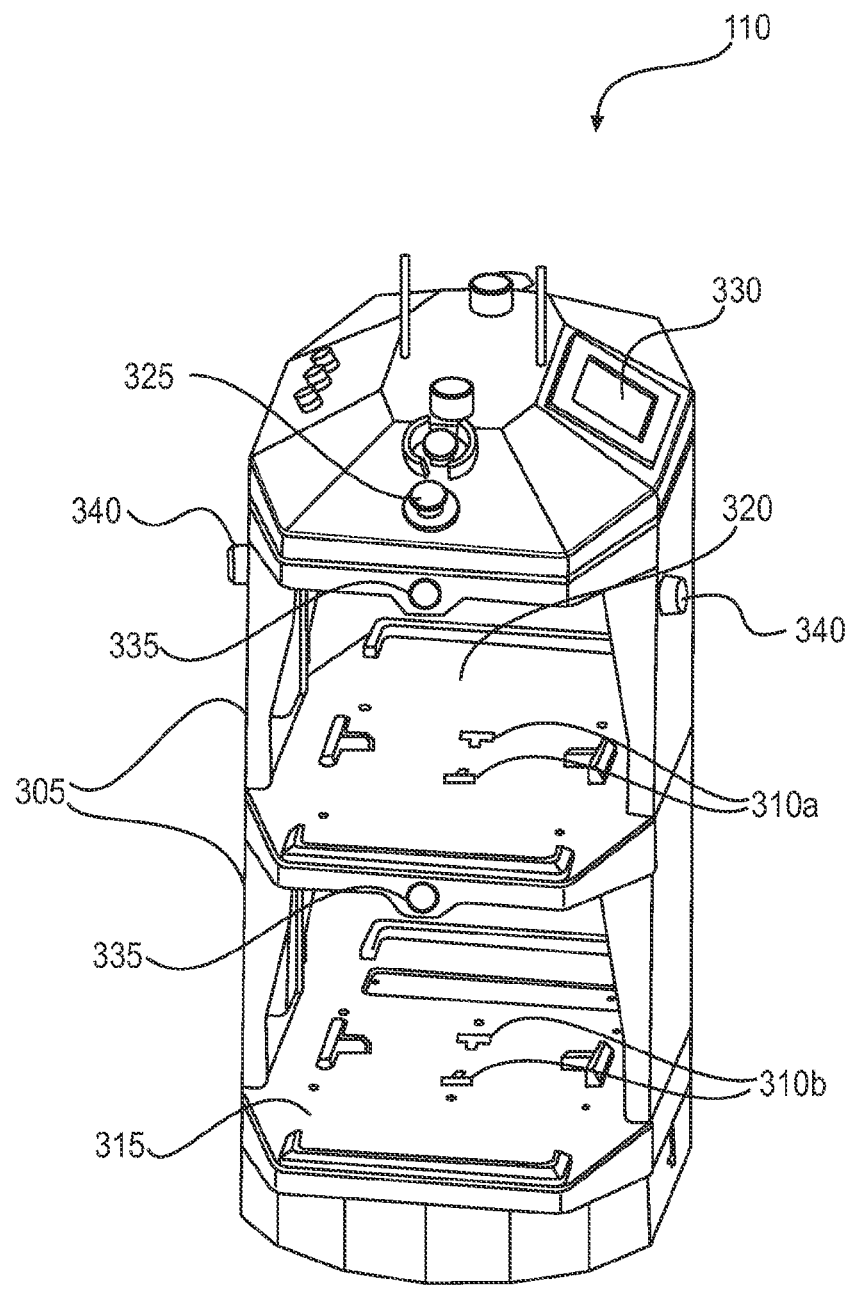
FIG. 3 shows a front perspective view of the robot payload without the robot base attached.

FIG. 3 shows a front perspective view of the robot payload 110 without the robot base 105 attached. As shown in FIG. 3, robot payload 110 comprises a multi-level cargo hold 305 for carrying cargo placed in the robot payload 110. A plurality of cargo presence sensors 310a and 310b are mounted below the plates 315 and 320 upon which the cargo sits in the first and second levels of the multilevel cargo hold 305. The cargo presence sensors 310a and 310b, which may be acquired, for example, from Keyence (P/N PZ-G42CP), are reflective sensors that are oriented to point upward. Two or more cargo "placement" micro-switch sensors may also be mounted on the plates 315 and 320 to indicate whether cargo has been placed properly (not angled) on the plates 315 and 320. In some embodiments, the wheels 135 on the mobile robot 100 may remain locked so that the mobile robot 100 cannot move with cargo until the status of the cargo presence sensors 310a and 310b are checked. Additionally, the cargo presence sensors 310a and 310b and cargo placement sensors may also be checked and used to ensure that the cargo is loaded from bottom to the top to ensure that the mobile robot 100 is not top-heavy while in motion. As shown in FIG. 3, human-machine interface devices, including a call button 325 and a touchscreen 330, may be attached to the robot payload 110 to enable communication with a human operator. On-board sonar sensors 335 and laser sensors 340 may also be provided on the robot payload 110 for obstacle detection and avoidance (as described herein).

Figure 4A:
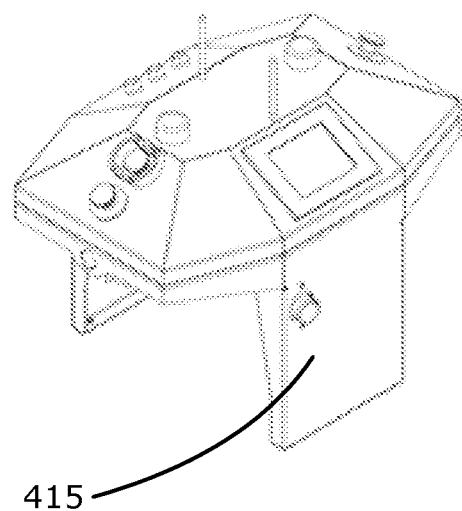
FIGS. 4A, 4B and 4C shows, in more detail, three components of the multilevel cargo hold 305 of the robot payload 110 shown in FIG. 3.
Figure 4B:
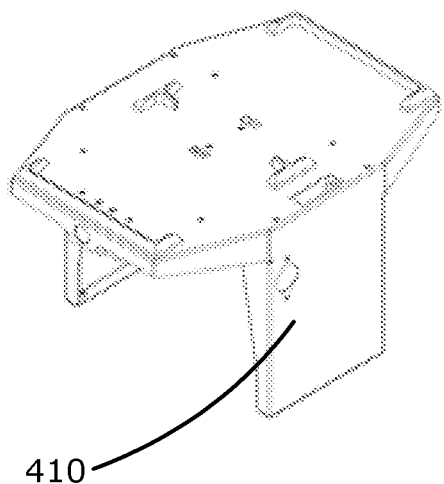
Figure 4C:
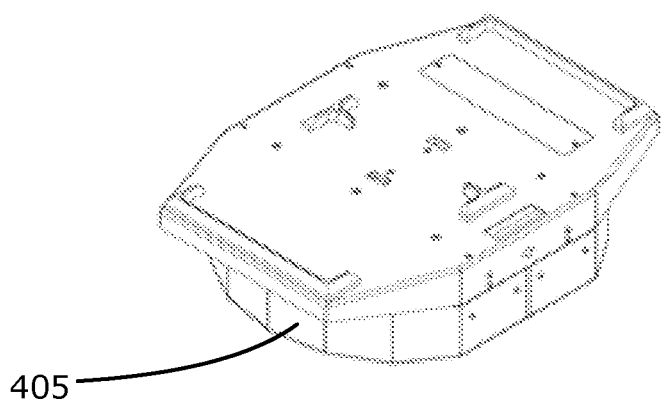

FIGS. 4A, 4B and 4C shows, in more detail, three components of the multilevel cargo hold 305 of the robot payload 110 shown in FIG. 3. In particular, as shown in FIGS. 4A, 4B and 4C, the robot payload 110 may comprise a cargo hold base 405, a cargo hold level 1 support 410 and a cargo hold level 2 support 415. The level 1 support 410 mounts onto the cargo hold base 405, and the level 2 support 415 mounts onto the level 1 support 410. The assembled robot payload 110 is then mounted onto the robot base 105 shown in FIG. 2. All electrical components in the robot payload 110 may be wired into an on-board PLC on the robot payload 110 or directly into the robot base 105.

Figure 5:
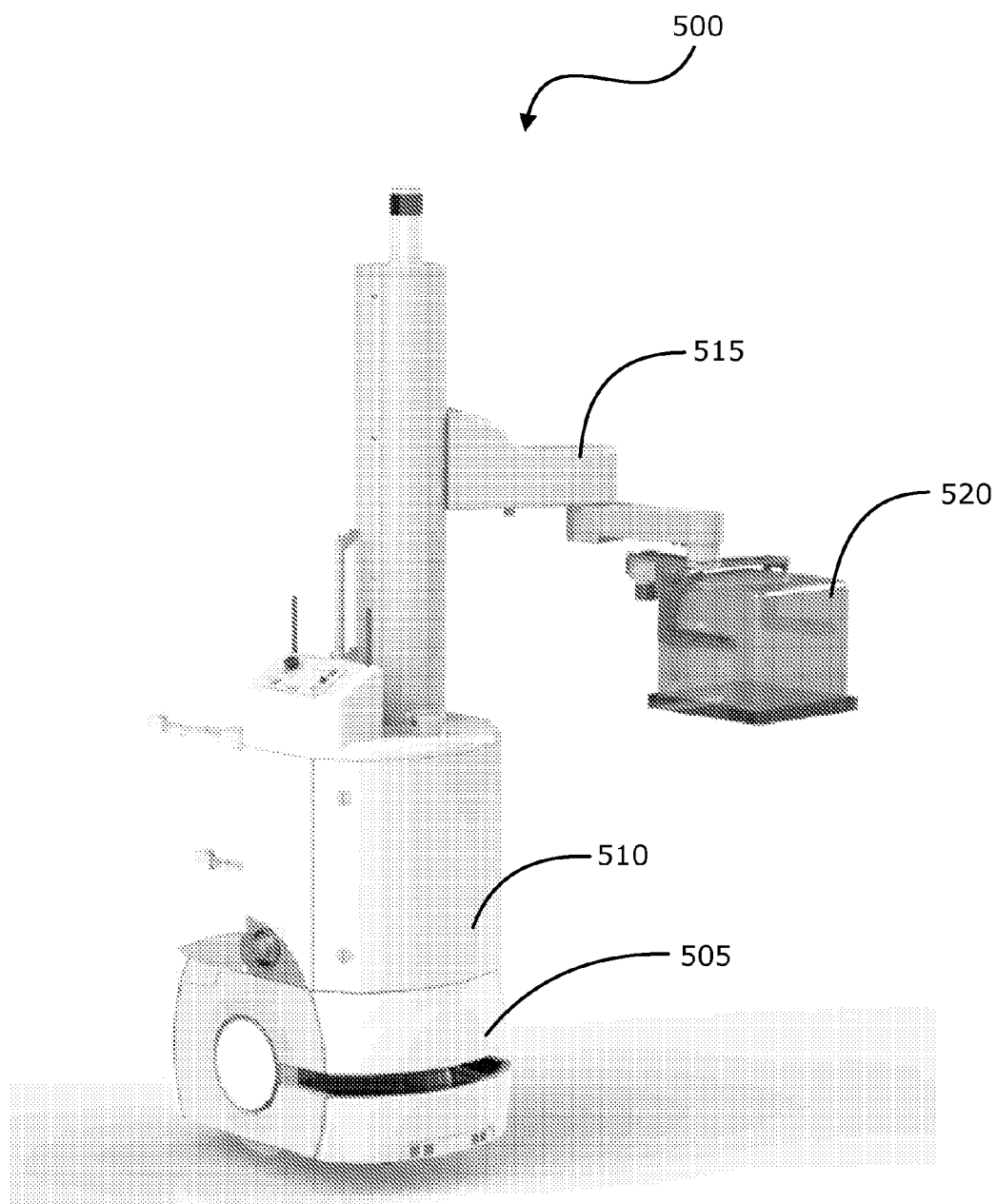
FIGS. 5 and 6 show additional exemplary embodiments of mobile robots configured to operate in accordance with the present invention FIG. 7 contains a high-level block diagram illustrating, by way of non-limiting example, some of the primary physical and logical components in an exemplary mobile robot configured to operate according to embodiments of the present invention.
Figure 6:
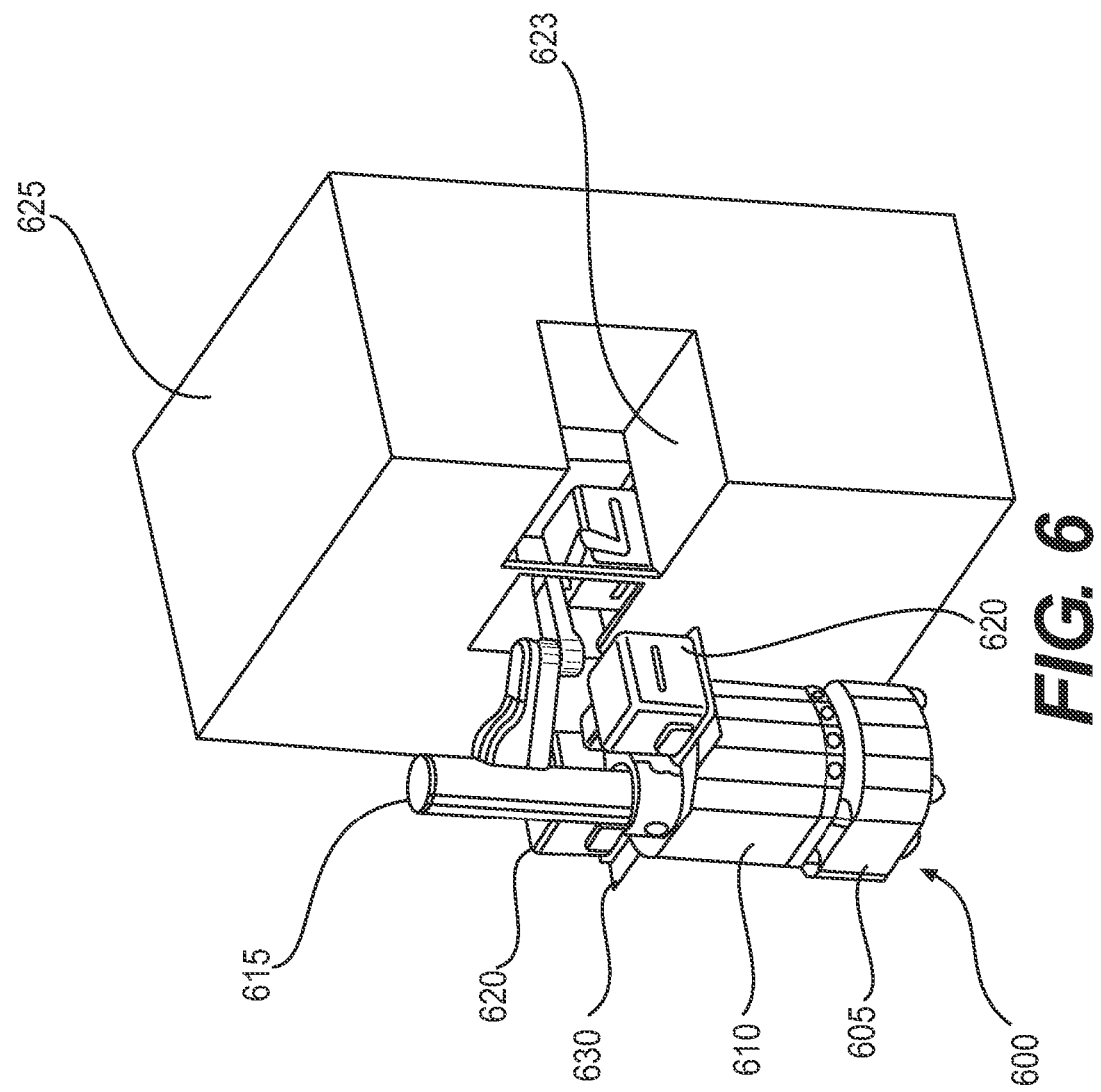

Additional exemplary embodiments of mobile robots configured to operate in accordance with the present invention are shown in FIGS. 5 and 6. As shown best in FIG. 5, an embodiment of the mobile robot 500 includes a robot base 505 configured to carry a robot payload 510. The robot payload 510 includes an articulated mechanical arm actuator 515 configured to identify, grasp and lift standard manufacturing interface "SMIF" pods 520. As shown in FIG. 6, mobile robot 600 also comprises a robot payload 610 having an articulated mechanical arm actuator 615. The articulated mechanical arm actuator 615 is configured to remove SMIF pods 620 from a platform 623 on workstation 625 and place the SMIF pods 620 on supports 630 attached to the robot payload 610. In preferred embodiments, the articulated mechanical arm actuator 615 may comprise a 4-degree of freedom SCARA (Selectively Compliant Articulated Robot Arm) or 6-degree of freedom articulated arm that is mounted on the robot base 605 of the mobile robot 600.

The robot base controller in the robot base 605 is programmed to activate the onboard navigation system in the robot base 605 to so that the mobile robot 600 carries the SMIF pods 620 directly to another location or workstation without following markers, rails or wires, and without colliding into stationary or non-stationary obstacles. More particularly, the onboard navigation system in the robot base 605 automatically determines, in accordance with a map stored on the robot base 600, a path to the next workstation. The onboard navigation system then uses the path to drive the mobile robot 600 to the location of the next workstation, avoiding negative and positive obstacles, as well as other robotic transporters, along the way.

Figure 7:
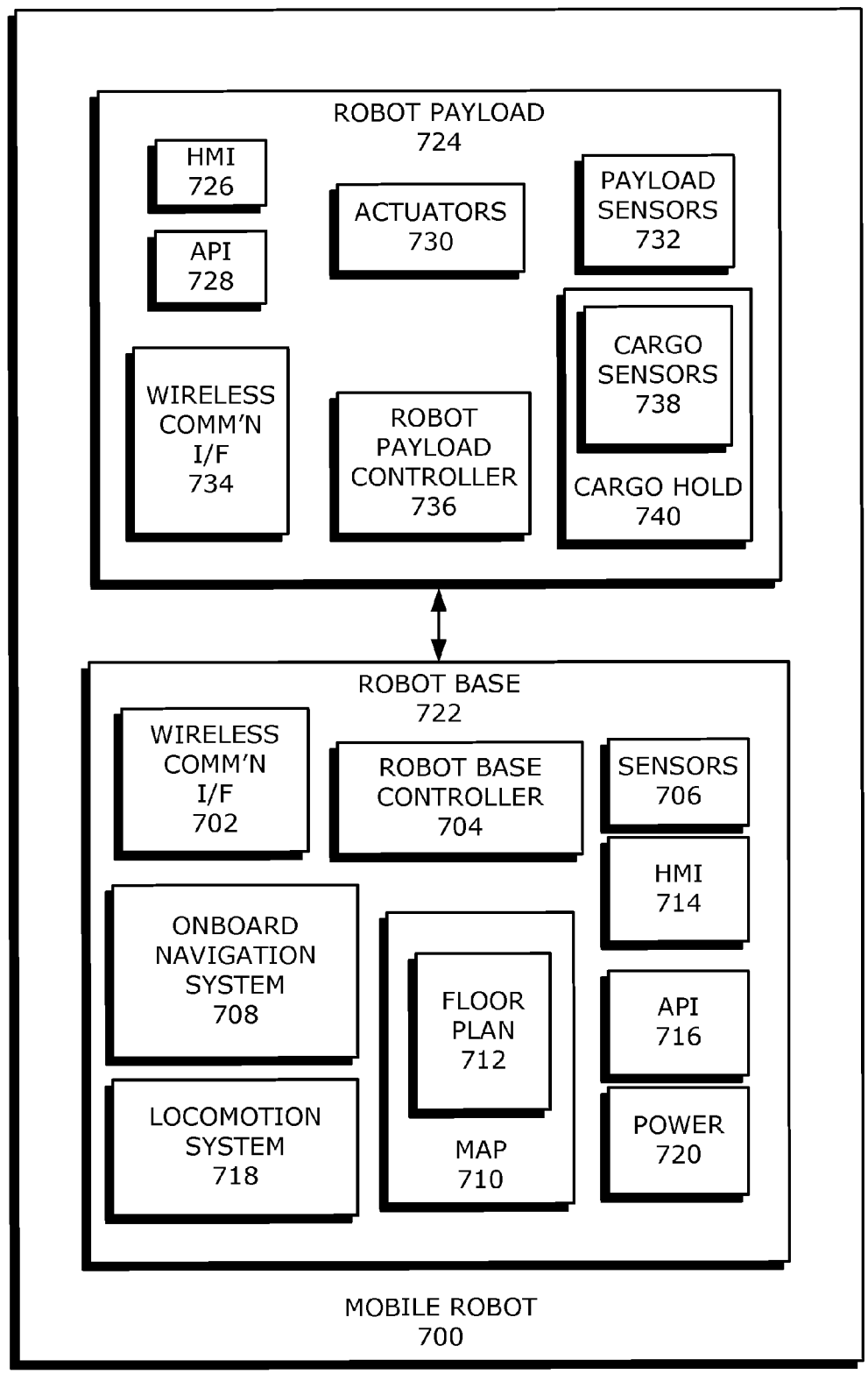

FIG. 7 contains a high-level block diagram illustrating, by way of non-limiting example, some of the primary physical and logical components in an exemplary mobile robot 700 configured to operate according to embodiments of the present invention. As shown in the block diagram of FIG. 7, the exemplary mobile robot 700 includes a robot base 722 and a robot payload 724. The robot base 722 comprises a variety of hardware and software components, including a robot base controller 704, an onboard navigation system 708, a locomotion system 718, a map 710 defining a floor plan 712, a wireless communication interface 702, sensors 706, a human-machine interface 714, an application programming interface (API) 716 and a power system 720.

The robot base controller 704 comprises computer program instructions executable on a microprocessor (not shown) on board the robot base 722 to initiate, coordinate and manage all of the automation functions associated with the mobile robot 700, including without limitation, handling of job assignments, automatic locomotion and navigation, communications with other computers and other robots, activating the robot payload functions and controlling power functions. The robot base controller 704 has an assignment manager (not shown) that keeps track of all of the robot's assignments and job operations. When a job assignment is received by the mobile robot 700, the robot base controller 704 activates the other subsystems in the mobile robot 700 to respond to the job assignment. Thus, the robot base controller 704 generates and distributes the appropriate command signals that cause other processing modules and units on the mobile robot 700 to start carrying out the requested job assignment. So, for example, when the received job assignment requires that the mobile robot 700 drive itself to a certain location in the physical environment, it is the robot base controller 704 that generates the command signal that causes the onboard navigation system 708 to start driving the mobile robot 700 to the specified destination. The robot base controller 704 also provides an activation signal for the robot payload 724, if necessary, to cause the robot payload 724 to perform a particular operation at the specified job location. The robot base controller 704 also manages and updates the map 710, and the floor plan 712, when appropriate, based on updated map or floor plan information received from other computer systems or other robots in the computer network. The robot base controller 704 also receives assignment status information, if any, from the robot payload 724 and, if appropriate, relays the status information out to a remote job management system (not shown), which typically delegates job assignments to the mobile robot 700. Typically, the robot base controller 704 will communicate with the job management system via an application programming interface (API) 716 and a wireless communications interface 702.

Figure 11:
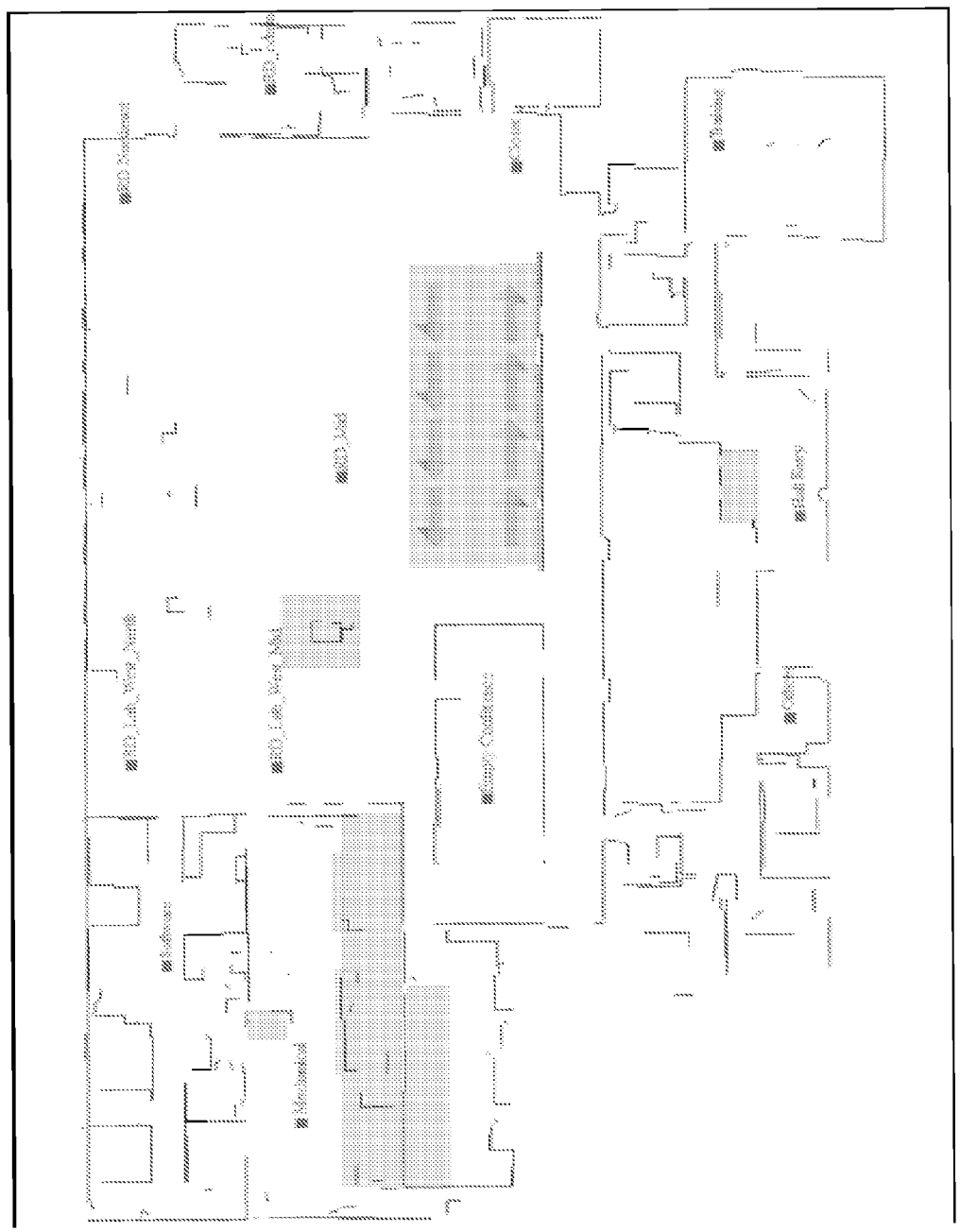
FIG. 11 shows a graphical representation of the map file illustrated in FIG. 10.

The map 710 defines a floor plan 712 corresponding to the physical environment, and also defines a set of job locations in terms of the floor plan 712. The map 710 also associates one or more job operations with one or more of the job locations in the set of job locations. FIG. 10 shows an example of the data content for a computer file comprising the map 710. FIG. 11 shows a graphical representation of the map 710. Each job location on the floor plan 712 corresponds to an actual location in the physical environment. Some of the job locations on the floor plan 712 will also have associated with them a set of one or more job operations to be carried out automatically by the mobile robot 700 after the mobile robot 700 arrives at the actual location. The map 710 may be obtained by the robot base controller 704 from the remote job management system (not shown) or, alternatively, from another mobile robot or from a standalone operating terminal for the network (not shown). Certain job operations on the floor plan may have multiple locations in the physical environment. It is understood, however, that not all job operations need to be pre-programmed into the map 710. It is also possible for job operations to be commanded as needed by the robot base controller 704, or the remote job management system, irrespective of the whether or not the job operation is defined in the map 710.

The onboard navigation system 708, operating under the control of the robot base controller 704, handles all of the localization, path planning, path following and obstacle avoidance functions for the mobile robot 700. If the system includes a positive and negative obstacle avoidance engine to help the mobile robot 700 avoid colliding with objects that may be resting on the floor but who's shape is not appropriately identified by the mobile robot's horizontally scanning laser, and to avoid driving into gaps in the floor, this functionality is encompassed by the onboard navigation system 708. The onboard navigation system 708 automatically determines the job location for the job assignment based on the map and the job assignment. Using sensors 706, the onboard navigation system 708 also detects when driving the mobile robot along a selected path from the mobile robot's current position to an actual location in the physical environment will cause the mobile robot to touch, collide or otherwise come too close to one or more of the stationary or non-stationary obstacles in the physical environment. When the onboard navigation system 708 determines that contact with an obstacle might occur, it is able to automatically plan a second path to the intended job location, in accordance with the map, to avoid the contact. The path planning may be accomplished using any one of a variety of robot path planning techniques known in the art. One such path planning technique is discussed in detail in Chapter 7 of the book "Artificial Intelligence and Mobile Robots," First Edition, published in 1998 by AAAI Press, and edited by David Kortenkamp, R. Peter Bonnaso and Robin Murphy. For purposes of the present invention, the path planning engine plans a path that avoids all of the locations that have been identified as containing obstacles. The onboard navigation system 708 may also use sensing lasers to sample objects in the physical environment, and compare the samples with information in the map 710. This process is called "laser localization," or "Monte Carlo localization with a laser." Another known technique, called light localization, involves using a camera to find lights in the ceiling and then comparing the lights found to lights identified on the map 710. All of these different techniques may be employed to help the onboard navigation system 708 determine its current position relative to the job location.

After the onboard navigation system 708 determines an alternative second path to the floor plan location representing the actual job location, it operates in combination with the locomotion system 718 to drive the mobile robot 700 from its current location to the actual job location using the second path. In some embodiments, the onboard navigation system 708 may subsequently determine that driving the mobile robot 700 to the actual job location along the second path may cause the mobile robot 700 to come into contact with another stationary or non-stationary obstacle, in which case the onboard navigation system 708 creates and uses a third path, in accordance with the map, to avoid the contact. Thus, the onboard navigation system 708 is capable of generating and changing the paths of travel between the mobile robot's current location and the floor plan location (representing the actual job location in the physical environment) as many times as necessary, to accomplish driving the mobile robot 700 to the actual job location. On the other hand, if the onboard navigation system 708 determines, via its internal path planning engine, that no path to the actual job location exists, it may optionally be programmed to send an error message back to the robot base controller 704, which reports the error condition out to a remote job management system, if appropriate.

The API 716 is operable with the robot base controller 704 and the wireless communication interface 702 to provide information and commands to the robot base controller 704, as well as retrieve job assignment status and route information from the robot base controller 704. For example, if the robot payload 724 needs to send information concerning the status of the cargo in the cargo hold 740 to the job management system (not shown), the cargo information may be transmitted from the robot cargo payload controller 736 to the robot base controller 704 via the API 716. The robot base controller 704 will then transmit the cargo information to the remote job management system through the same API 716. In preferred embodiments, API 716 is ARCL or ArInterface, an application programming interface distributed by Omron Adept Technologies, Inc. of San Ramon, Calif. However, other API's may be suitably adapted and used to provide communication between the mobile robot 700 and other computer systems.

Sensors 706 may comprise a collection of different sensors, such as sonar sensors, bumpers, cameras, gas sensors, smoke sensors, motion sensors, etc., and can be used to perform a variety of different functions. These sensors may also be used for traffic mitigation by redirecting the mobile robot 700 when other mobile robots are detected in the immediate surroundings. Other elements on the robot base include Power 720, which typically includes a battery and software to manage the battery.

The locomotion system 718 includes the hardware and electronics necessary for making the mobile robot 700 move, including, for example, motors, wheels, feedback mechanisms for the motors and wheels, and encoders. The onboard navigation system 708 typically "drives" the mobile robot 700 by sending commands down to the wheels and motors through the locomotion system 718.

The human-machine interface, or HMI 714, typically includes the hardware and electronics, such as buttons, switches, touchscreens, touchpads, speakers, as well as software controllers for buttons, switches, touchscreens, touchpads and speakers, which enable the mobile robot 700 to provide data to and receive commands and other input from humans.

Turning now to the components of the robot payload 724, the cargo sensors 738 provide signals to the robot payload controller 736 and, possibly, directly to robot base controller 704 by means of API 716, which permit the robot payload controller 736 and/or robot base controller 704 to make programmatic decisions about whether the mobile robot 700 has completed an assignment or is available to acquire more cargo. HMI 726 may include buttons, switches, keyboards, touchscreens, etc., or some combination of buttons, switches, keyboards and touchscreens, used to communicate with a human operator. Humans can, for example, use the HMI 726 to make the mobile robot 700 proceed to a specified location in the physical environment by selecting the location on the mobile robot's internal map 710. To facilitate selection of a new location, mobile robot 700 may be configured to display locations, floor plans, zones and sectors defined by the map 710 on an HMI 726 comprising a display screen.

Payload sensors 732 may include, for example, temperature or gas sensors, cameras, RFID readers, environmental sensors, wireless Ethernet sniffing sensors, etc. Payload sensors 732 may be used to provide information about the state of the robot payload 724, the state of the cargo in the cargo hold 740, the state of the physical environment, the proximity of the mobile robot 700 to physical objects, or some combination of all of this information.

Actuators 730 may include a wide range of devices, including without limitation, linear actuators, panning and tilting units, articulated mechanical arms, conveyor belts, non-mobile industrial robots, manipulators, lifts, drills, pumps and sprayers. Could be anything to distribute things into or collect things from the environment.

The robot payload 724 may also include a wireless communications interface 734, which sends information to and receives information from other devices or networks. Telepresence applications, which permit, for example, physicians to see and speak with patients by using remotely-controlled mobile robots carrying video and audio recording equipment, may use the wireless communications interface 734, for instance, to relay the video and audio signals from the mobile robot 700 to the remotely-located physician.

The robot payload controller 736 processes command and operation signals coming into the robot payload 724 and generally controls and coordinates all of the functions performed by the robot payload 724. In preferred embodiments, the robot payload controller 736 can also cancel a job assignment. For example, if the mobile robot 700 arrives at a specified job location to pick up an item, such as a SMIF pod, and learns through sensors or vision technology attached to the robot payload 724 that the SMIF pod is not present at that location, then the robot payload controller 736 can cancel the job assignment by generating a job cancellation signal and transmitting it to the robot base controller 704 in the robot base 722, along with a string of data that indicates the reason for the cancellation. The robot base controller 704 typically relays that cancellation signal to the job management system to inform the job management system that mobile robot 700 is now available to receive a new job assignment. When it is done with an assignment, the robot payload controller 736 sends a completion signal to the robot base controller 704, or alternatively, toggles a I/O bit in the memory of the robot base 722, which informs the robot base controller 704 that the job assignment is completed.

Figure 8:
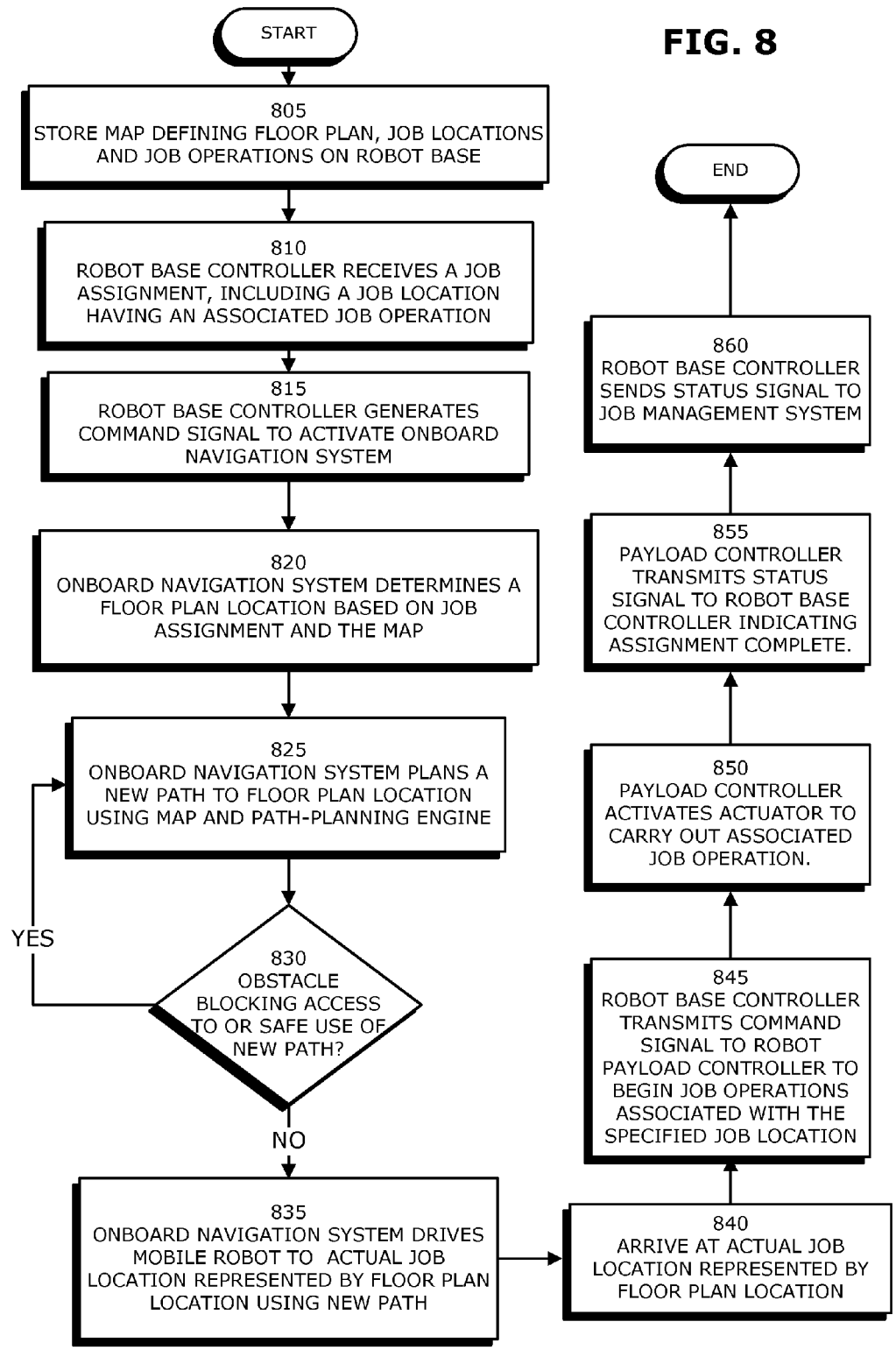
FIG. 8 contains a high-level flow diagram illustrating, by way of example, the primary steps and operations that may be performed by a mobile robot operating according to an embodiment of the present invention.

FIG. 8 contains a high-level flow diagram illustrating, by way of example, the primary steps and operations that may be performed by a mobile robot operating according to an embodiment of the present invention. In the first step, at step 805, a map defining a floor plan for the physical environment is stored on the robot base. The map also defines a set of job locations in respect to the floor plan by, for example, associating certain job locations with certain two-dimensional coordinates on the floor plan. The map also associates certain job operations with certain job locations on the floor plan. The association of job operations with certain job locations provides the propulsion system with the information it needs to automatically determine, for those certain job locations, which job operations should be performed at those job locations. It also permits the mobile robot 700 to derive job locations based on assignments that only specify the associated job operations.

Next, in step 810, the robot base controller receives a job assignment. Typically, but not necessarily, the job assignment is received from a remote job or enterprise management system in charge of processing job requests that might be generated, for example, by an automated order management system or automated warehouse management system operatively connected to the job management system. The job assignment may specify a job location, a job operation, or both a job location and job operation. If a job location is specified, the specified job location may, or may not, have one or more job operations associated with it by the definitions in the map. At step 815, in response to receiving the job assignment, the robot base controller generates a command signal or instruction that activates the onboard navigation system. Then, in step 820, the onboard navigation system determines a floor plan location based on the map stored on the robot base and the job assignment (e.g., the specified job location, if any). The floor plan location is a location on the floor plan (e.g., a two- or three-dimensional coordinate) that corresponds to the specified job location based on the map. The floor plan location also corresponds to, or represents, an actual job location in the real-world physical environment in which the mobile robot operates.

Figure 9:
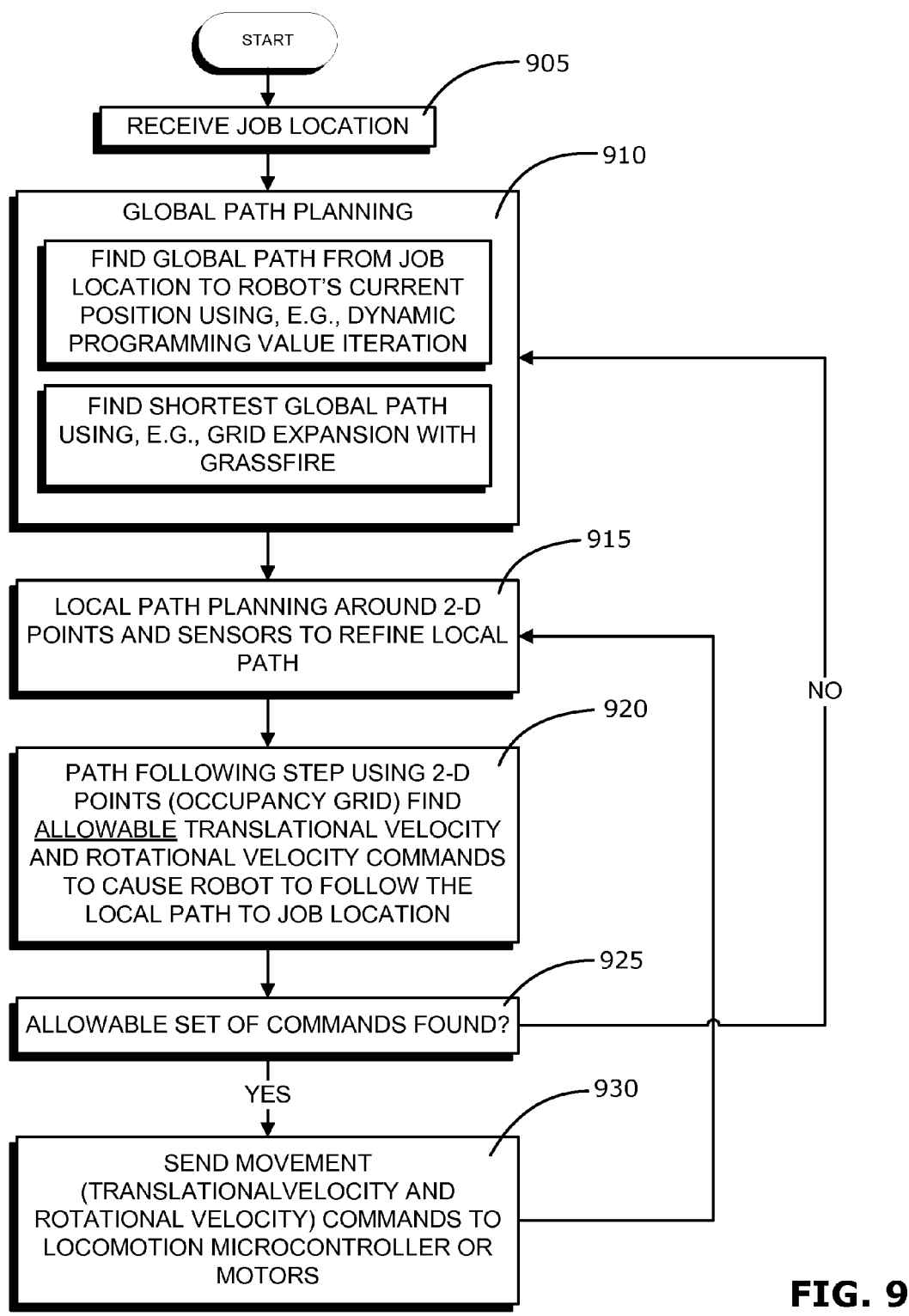
FIG. 9 illustrates, by way of example only, a known algorithm a mobile robot might use to plan a path between the mobile robot's current position and a particular location in accordance with a map.

At step 825, the onboard navigation system uses any one of a number of known path planning techniques to generate a new path (i.e., a route) between the mobile robot's current position on the map to the floor plan location. FIG. 9 shows a high-level flow diagram illustrating the steps in one example of such a path planning technique. The mobile robot may determine its current position by using any one of a number of known localization techniques, including, for example, comparing laser or camera sensor readings identifying doors, walls and overhead lights to the locations of such doors, walls and overhead lights on an electronic representation of a map stored in the mobile robot's memory. The localization map may, or may not, be the same map the onboard navigation system uses to define the job operations and job locations for the floor plan.

Next, at step 830, the onboard navigation system automatically determines whether using the new path generated in step 830 above is likely to cause the mobile robot to come into contact with a stationary obstacle (such as a door, a wall or piece of furniture) or non-stationary obstacle (such as a human being, other mobile robot or vehicle) in the physical environment. Put another way, the onboard navigation system determines whether there is a stationary or non-stationary obstacle blocking access to or safe use of the new path generated in step 825 above. Depending on the requirements of the particular system and the physical environment, a path may be considered to be "blocked" based on any number of conditions and/or operator preferences. In some situations, for example, access to a new path may be considered "blocked" if there is even a remote possibility that using the new path will cause the mobile robot to come into "contact" with a human being. In the context of this disclosure, coming into "contact" with a human being or other obstacle could mean anything from actually colliding with the human being or other obstacle to merely coming within a certain range or distance of the human being or other obstacle. Thus, the term "contact" is not limited herein to mean actual physical contact. For example, contact may also mean coming within sensor range or entering the same room or zone. Techniques for determining the likelihood that a mobile robot will come into contact with an obstacle in the physical environment are known. One technique, for example, is to install sonar or laser sensors on the front of the mobile robot and use the readings of these sensors to determine the mobile robot's proximity to a person or thing as it travels along an intended path.

If the onboard navigation system determines that contact will occur, or might occur, the onboard navigation system program returns again to step 825 to plot a new path between the mobile robot's current position and the job location. When the new path is generated, the program will again check to see if the path is "clear." Thus, as illustrated by the loop at steps 825 and 830, the onboard navigation system program will check and revise the path between the mobile robot's current position and the selected or implied location as many times as necessary to find a new path that does not involve coming into contact with a stationary or non-stationary obstacle.

When onboard navigation system finds a new path that can be used without bringing the mobile robot into contact with an obstacle, the onboard navigation system automatically "drives" the mobile robot to the actual job location in the physical environment using the new path. See step 835. When the mobile robot arrives at the actual job location, embodiments of the present invention may be configured so that, as shown in steps 840 and 845, the robot base controller automatically transmits a command signal to the payload controller to begin a job operation (or set of job operations) associated by the map with the specified job location in the assignment. For example, if there is one job operation associated with the specified job location, that job operation may comprise an operation such as "unload cargo." If a set of job operations are associated with the specified job location, then the set of job operations might include, for example, "pick up cargo, rotate −90 degrees, drive 50 yards, and unload cargo." At step 850, the payload controller automatically activates an actuator to carry out the associated job operation or set of job operations, and the payload controller sends a status signal back to the robot base controller when the assignment is complete. Finally, at step 860, the robot base controller sends a status signal back to the job management system, if appropriate, informing the job management system that the assignment is complete.

FIG. 9 illustrates, by way of example only, a known algorithm a mobile robot might use to plan a path between the mobile robot's current position and a particular location in accordance with a map and a floor plan delineated by a two-dimensional coordinate system. In general, the steps of the path planning algorithm include receiving the job location (step 905), planning a global path to the job location (step 910), planning a local path around detected and remembered obstacles (step 915), finding an allowable set of movement commands for the mobile robot in order to follow the path (step 925) and sending the movement commands to a locomotion controller or motors (step 930).

The above-described preferred embodiments are intended to illustrate the principles of the invention, but not to limit its scope. Various other embodiments, modifications and equivalents to these preferred embodiments may occur to those skilled in the art upon reading the present disclosure or practicing the claimed invention. Such variations, modifications and equivalents are intended to come within the scope of the invention and the appended claims.

What is claimed is:

1. A mobile robot for handling a job assignment in a physical environment inhabited by stationary and non-stationary obstacles, the mobile robot comprising:
   a) a robot base, comprising
      (i) a map defining a floor plan for the physical environment, a set of job locations in respect to the floor plan, and associating a set of job operations with two or more job locations in the set of job locations;
      (ii) a robot base controller that receives the job assignment, the job assignment including a specified job location without specifying a job operation, the specified job location being associated by the map with said set of job operations; and
      (iii) an onboard navigation system;
   b) wherein, in response to receiving the job assignment, the onboard navigation system automatically
      (i) determines a floor plan location based on the job assignment and the map, the floor plan location representing an actual location in the physical environment,
      (ii) determines, in accordance with the map, that moving the mobile robot from the mobile robot's current position to the floor plan location by driving the mobile robot along a first path will cause the mobile robot to come into contact with one of said stationary and non-stationary obstacles in the physical environment,
      (iii) generates a second path from the mobile robot's current position to the floor plan location, in accordance with the map, to avoid said contact, and
      (iv) drives the mobile robot to the actual location represented by the floor plan location using the second path; and
   c) the robot base controller causes the mobile robot to automatically perform said set of job operations associated in the map with the specified job location after the mobile robot arrives at the actual location;
   d) wherein the set of job operations associated with the specified job location in the map is different from the set of one or more job operations associated with another job location in the map.

2. The mobile robot of claim 1, wherein the onboard navigation system automatically:
   a) determines that driving the mobile robot along said second path will cause the mobile robot to come into contact with one of said stationary and non-stationary obstacles;
   b) generates a third path from the mobile robot's current position to the floor plan location, in accordance with the map, to avoid said contact; and
   c) drives the mobile robot to the actual location represented by the floor plan location using the third path.

3. The mobile robot of claim 1, wherein the onboard navigation system automatically determines the first path in accordance with the map.

4. The mobile robot of claim 1, wherein:
   a) the robot base comprises a wireless communications interface; and
   b) said first path is received by the mobile robot from a remote source via the wireless communications interface.

5. The mobile robot of claim 1, wherein:
   a) the robot base further comprises a sensor configured to provide the onboard navigation system with sensor readings corresponding to a current position of one of the stationary and non-stationary obstacles; and
   b) the onboard navigation system uses the sensor readings to determine that driving the mobile robot to the floor plan location along said first path will cause the mobile robot to come into contact with said one of the stationary and non-stationary obstacles.

6. The mobile robot of claim 1, wherein:
   a) the map provides the current positions of said non-stationary obstacles; and
   b) the onboard navigation system uses said current positions to determine that driving the mobile robot to the floor plan location along said first path will cause the mobile robot to come into contact with one of said stationary and non-stationary obstacles.

7. The mobile robot of claim 6, wherein said robot base periodically receives updated information for the map, said updated information accounting for changes in the current positions for said non-stationary obstacles.

8. The mobile robot of claim 1, wherein:
   a) the map provides a set of currently-selected paths for said non-stationary obstacles; and
   b) the onboard navigation system uses said set of currently-selected paths to determine that driving the mobile robot to the floor plan location along said first path will cause the mobile robot to come into contact with one of said non-stationary obstacles.

9. The mobile robot of claim 8, wherein said robot base periodically receives updated information for the map, said updated information accounting for changes in the set of currently-selected paths for said non-stationary obstacles.

10. The mobile robot of claim 1, wherein said non-stationary obstacles include one or more of: another mobile robot, a human being, a motorized vehicle and a non-motorized vehicle.

11. The mobile robot of claim 1, wherein said stationary obstacles include one or more of: a wall, a door, a door frame, a piece of furniture, a workstation, a manufacturing tool, a break in the travelling surface for the mobile robot, an object suspended above said travelling surface, a restricted zone in the physical environment, a contaminated zone in the physical environment and a dangerous zone in the physical environment.

12. The mobile robot of claim 1, wherein:
a) the robot base comprises a wireless communications interface; and
b) the robot base controller receives the job assignment via the wireless communications interface.

13. The mobile robot of claim 12, wherein the wireless communication interface receives the job assignment from a remote job management system.

14. The mobile robot of claim 12, wherein the wireless communication interface receives the job assignment from a remote personal computer system.

15. The mobile robot of claim 12, wherein the wireless communication interface receives the job assignment from a second mobile robot in the physical environment.

16. The mobile robot of claim 1, wherein:
a) the robot base comprises a human-machine interface; and
b) the robot base controller receives the job assignment from a human being via the human-machine interface.

17. The mobile robot of claim 16, wherein the human-machine interface comprises one or more of a display device, a monitor, a keyboard, a keypad, a touch screen, a scanner, a telephone, a printer, a button, a speaker, a switch, a camera and a light.

18. The mobile robot of claim 1, further comprising:
a) a robot payload, connected the robot base;
b) wherein the robot base controller generates a command signal that causes the robot payload to automatically perform said at least one associated job operation after the mobile robot arrives at the floor plan location.

19. The mobile robot of claim 18, wherein the robot payload comprises an actuator.

20. The mobile robot of claim 19, wherein the actuator comprises one or more of an articulated robotic arm, an electromechanical manipulator, a portable robot, an electric motor, a panning unit, a tilting unit, a conveyor, a mechanical lifting device, a mechanical gripping device, a pump, a sprayer, a vacuum device, a laser, a sampler and a linear actuator.

21. The mobile robot of claim 18, wherein the robot payload includes a sensor.

22. The mobile robot of claim 21, wherein the sensor comprises one or more of a video recorder, a sound recorder, a photographic image recorder, an RFID reader, a magnetic stripe reader, a barcode reader, a gas detector, a particle detector, a temperature sensor, a scanner, a distance sensor, a near-field communication sensor and a wireless signal detector.

23. The mobile robot of claim 18, further comprising a human-machine interface attached to the robot payload.

24. The mobile robot of claim 23, wherein the human-machine interface attached to the robot payload comprises one or more of a display device, a monitor, a keyboard, a keypad, a scanner, a telephone, a printer, a button, a speaker, a camera, a switch and a light.

25. The mobile robot of claim 18, wherein the robot payload comprises:
a) a cargo hold; and
b) a sensor configured to detect whether an object is located within the cargo hold.

26. The mobile robot of claim 18, wherein:
a) the robot payload comprises a cargo hold and a mechanical arm; and
b) a job execution signal generated by the robot base controller causes the mechanical arm to pick up an object and move said object into the cargo hold.

27. The mobile robot of claim 18, wherein:
a) the robot payload comprises a cargo hold and a mechanical arm; and
b) a job execution signal generated by the robot base controller causes the mechanical arm to remove an object from the cargo hold.

28. The mobile robot of claim 1, wherein:
a) the robot base controller comprises a status manager configured to record a current status for the mobile robot; and
b) the current status is transmitted to a remote job management system.

29. The mobile robot of claim 18, wherein:
a) the robot base comprises a wireless communications interface;
b) the robot base controller comprises a status manager configured to record a current status for the mobile robot; and
c) the current status is communicated to another mobile robot in the physical environment via the wireless communications interface.

30. The autonomous mobile robot of claim 1, wherein the onboard navigation system further comprises a locomotion system.

31. In a physical environment inhabited by stationary and non-stationary obstacles, a method of handling a job assignment with a mobile robot comprising a robot base and an onboard navigation system, the method comprising:
a) storing on the robot base a map defining a floor plan corresponding to the physical environment, a set of job locations in respect to the floor plan, and associating a set of job operations with two or more job locations in the set of job locations;
b) receiving the job assignment on the robot base, the job assignment including a specified job location without specifying a job operation, the specified job location being associated by the map with said set of job operations; and
c) in response to receiving the job assignment, activating the onboard navigation system to automatically
(i) determining a floor plan location based on the specified job location and the map, the floor plan location corresponding to an actual location in the physical environment;
(ii) determining, in accordance with the map, that moving the mobile robot from the mobile robot's current position to the floor plan location by driving the mobile robot along a first path will cause the mobile robot to come into contact with one of said stationary and non-stationary obstacles in the physical environment;
(iii) generating a second path from the mobile robot's current position to the floor plan location, in accordance with the map, to avoid said contact; and (iv) driving the mobile robot to the actual location represented by the floor plan location using the second path; and
d) causing the mobile robot to automatically perform said set of job operations associated in the map with the specified job location after the mobile robot arrives at the actual job location;
e) wherein the set of job operations associated with the specified job location in the map is different from the set of one or more job operations associated with another job location in the map.

32. The method of claim 31, further comprising:
a) determining that driving the mobile robot along said second path will cause the mobile robot to come into contact with one of said stationary and non-stationary obstacles;
b) generating a third path from the mobile robot's current position to the floor plan location, in accordance with the map, to avoid said contact; and
c) driving the mobile robot to the actual location represented by the floor plan location using the third path.

33. The method of claim 31, further comprising determining said first path on the onboard navigation system in accordance with the map.

34. The method of claim 31, further comprising receiving said first path on the mobile robot from a remote source via a wireless communications interface on the robot base.

35. The method of claim 31, further comprising:
a) receiving sensor readings on the onboard navigation system, the sensor readings corresponding to a current position of one of the stationary and non-stationary obstacles; and
b) using the sensor readings on the onboard navigation system to determine that driving the mobile robot to the floor plan location along said first path will cause the mobile robot to come into contact with said one of the stationary and non-stationary obstacles.

36. The method of claim 31, further comprising:
a) storing in the map a description of the current positions of said non-stationary obstacles; and
b) on the onboard navigation system, using said description in the map to determine that driving the mobile robot to the specified job location along said first path will cause the mobile robot to come into contact with one of said stationary and non-stationary obstacles.

37. The method of claim 36, further comprising periodically receiving on the robot base an updated description for the map, said updated description accounting for changes in the current positions for said non-stationary obstacles.

38. The method of claim 31, further comprising:
a) storing in the map a set of currently-selected paths for said non-stationary obstacles; and
b) on the onboard navigation system, using said set of currently-selected paths to determine that driving the mobile robot to the floor plan location along said first path will cause the mobile robot to come into contact with one of said non-stationary obstacles.

39. The method of claim 38, further comprising periodically receiving updated information for the map, said updated information accounting for changes in the set of currently-selected paths for said non-stationary obstacles.

40. The method of claim 31, wherein said non-stationary obstacles include one or more of: another mobile robot, a human being, a motorized vehicle and a non-motorized vehicle.

41. The method of claim 31, wherein said stationary obstacles include one or more of: a wall, a door, a door frame, a piece of furniture, a workstation, a manufacturing tool, a break in the travelling surface for the mobile robot, an object suspended above said travelling surface, a restricted zone in the physical environment, a contaminated zone in the physical environment and a dangerous zone in the physical environment.

42. The method of claim 31, further comprising receiving the job assignment via a wireless communications interface on the robot base.

43. The method of claim 42, further comprising receiving the job assignment from a remote job management system via a wireless communications interface on the robot base.

44. The method of claim 42, further comprising receiving the job assignment from a remote personal computer system via a wireless communication interface on the robot base.

45. The method of claim 42, further comprising receiving the job assignment from a second mobile robot in the physical environment via a wireless communication interface on the robot base.

46. The method of claim 31, further comprising receiving the job assignment from a human being via a human-machine interface attached to the robot base.

47. The method of claim 46, wherein the human-machine interface comprises one or more of a display device, a monitor, a keyboard, a keypad, a touch screen, a scanner, a telephone, a printer, a button, a speaker, a switch, a camera and a light.

48. The method of claim 31, further comprising:
a) connecting a robot payload to the robot base; and
b) generating a command signal by the robot base controller that causes the robot payload to automatically perform said at least one job operation after the mobile robot arrives at the floor plan location.

49. The method of claim 48, wherein the robot payload comprises an actuator.

50. The method of claim 49, wherein the actuator comprises one or more of an articulated robotic arm, an electromechanical manipulator, a portable robot, an electric motor, a panning unit, a tilting unit, a conveyor, a mechanical lifting device, a mechanical gripping device, a pump, a sprayer, a vacuum device, a laser, a sampler and a linear actuator.

51. The method of claim 48, wherein the robot payload includes a sensor.

52. The method of claim 51, wherein the sensor comprises one or more of a video recorder, a sound recorder, a photographic image recorder, an RFID reader, a magnetic stripe reader, a barcode reader, a gas detector, a particle detector, a temperature sensor, a scanner, a distance sensor, a near-field communication sensor and a wireless signal detector.

53. The method of claim 48, further comprising attaching a human-machine interface to the robot payload.

54. The method of claim 53, wherein the human-machine interface attached to the robot payload comprises one or more of a display device, a monitor, a keyboard, a keypad, a scanner, a telephone, a printer, a button, a speaker, a camera, a switch and a light.

55. The method of claim 48, further comprising:
a) placing an object in a cargo hold attached to the robot payload; and
b) using a sensor on the robot payload to detect that the object is located within the cargo hold.

56. The method of claim 48, further comprising activating a mechanical arm attached to the robot payload to place an object into a cargo hold attached to the robot payload.

57. The method of claim 48, further comprising activating a mechanical arm attached to the robot payload to remove an object from a cargo hold attached to the robot payload.

58. The method of claim 31, further comprising:
   a) recording a current status for the mobile robot on the robot base; and
   b) transmitting the current status to a remote job management system.

59. The method of claim 31, further comprising:
   a) recording a current status for the mobile robot on the robot base; and
   b) transmitting the current status to another mobile robot in the physical environment via a wireless communications interface on the robot base.

60. The autonomous method of claim 31, wherein the onboard navigation system further comprises a locomotion system.

\* \* \* \* \*